US009553940B2

(12) United States Patent
Oh et al.

(10) Patent No.: US 9,553,940 B2
(45) Date of Patent: Jan. 24, 2017

(54) SYSTEM AND METHOD FOR CONTROLLING SIP-SPECIFIC EVENT NOTIFICATION ACCORDING TO PREFERENCE OF SUBSCRIBER

(75) Inventors: Jae-Kwon Oh, Seoul (KR); Wuk Kim, Gwacheon-si (KR)

(73) Assignee: Samsung Electronics Co., Ltd (KR)

( * ) Notice: Subject to any disclaimer, the term of this patent is extended or adjusted under 35 U.S.C. 154(b) by 981 days.

(21) Appl. No.: 12/195,827

(22) Filed: Aug. 21, 2008

(65) Prior Publication Data

US 2009/0055532 A1  Feb. 26, 2009

(30) Foreign Application Priority Data

Aug. 21, 2007  (KR) .............................. 2007-0083984
Jan. 22, 2008  (KR) .............................. 2008-0006876

(51) Int. Cl.
*G06F 15/16* (2006.01)
*H04L 29/08* (2006.01)

(52) U.S. Cl.
CPC ............. *H04L 67/24* (2013.01); *H04L 67/306* (2013.01); *H04L 67/327* (2013.01)

(58) Field of Classification Search
USPC .......................................... 709/227; 455/518
See application file for complete search history.

(56) References Cited

U.S. PATENT DOCUMENTS 7,292,561 B2 * 11/2007 Hyun .................... H04W 48/18
                                                    370/338
7,536,481 B2 *  5/2009 Sekaran ................. H04L 67/10
                                                    709/203
7,543,190 B2 *  6/2009 Walker ................ G06F 11/0745
                                                    714/43

(Continued)

FOREIGN PATENT DOCUMENTS

CN           1859139         11/2006
CN           1973509          5/2007

(Continued)

OTHER PUBLICATIONS

Khartabil et al.: "Functional Description of Event Notification Filtering", Sep. 1, 2006.

(Continued)

*Primary Examiner* — Alicia Baturay
(74) *Attorney, Agent, or Firm* — The Farrell Law Firm, P.C.

(57) ABSTRACT

Disclosed is a system and method for controlling Session Initiation Protocol (SIP)-specific event notification corresponding to an event subscription according to a preference of a subscriber. The system includes the subscriber requesting an event subscription through an event notification controller; a subscription target for notifying the subscriber of the event through the event notification controller in response to the event subscription request; and the event notification controller for controlling whether the event notification is forwarded to the subscriber according to the (Continued)

preference rules of the subscriber on event notifications. Accordingly, the event notifications to the subscriber can be effectively controlled according to the preference rules of the subscriber on event notifications, and it is possible to prevent the generation of unnecessary event notification that the subscriber does not desire.

69 Claims, 16 Drawing Sheets

(56) References Cited

U.S. PATENT DOCUMENTS

| | | | |
|---|---|---|---|
| 7,650,384 B2* | 1/2010 | Ramanathan et al. | 709/206 |
| 7,711,810 B2* | 5/2010 | McKinnon | H04M 3/42365 709/223 |
| 7,836,126 B2* | 11/2010 | Thommes | G06Q 10/06 379/265.05 |
| 7,844,294 B1* | 11/2010 | Manroa et al. | 455/518 |
| 7,945,679 B2* | 5/2011 | Watanabe | H04L 69/329 379/67.1 |
| 8,064,575 B1* | 11/2011 | Dhanoa | H04L 12/5815 379/201.01 |
| 8,639,280 B2 | 1/2014 | Allen et al. | |
| 8,706,090 B2* | 4/2014 | Boyer | H04M 3/53333 455/413 |
| 2003/0236892 A1 | 12/2003 | Coulombe | |
| 2004/0015589 A1 | 1/2004 | Isozu | |
| 2005/0022237 A1 | 1/2005 | Nomura | |
| 2005/0068167 A1* | 3/2005 | Boyer | H04L 12/581 340/531 |
| 2005/0071428 A1* | 3/2005 | Khakoo | G06Q 10/107 709/204 |
| 2005/0289097 A1 | 12/2005 | Trossen et al. | |
| 2006/0053208 A1 | 3/2006 | Laurila et al. | |
| 2006/0140189 A1* | 6/2006 | Wu | G06Q 10/107 370/395.2 |
| 2006/0143646 A1* | 6/2006 | Wu | H04M 3/42365 725/10 |
| 2006/0253455 A1* | 11/2006 | Potra | G06F 17/30011 |
| 2006/0286993 A1* | 12/2006 | Xie et al. | 455/518 |
| 2007/0016649 A1* | 1/2007 | Nishiki | H04L 67/24 709/206 |
| 2007/0021138 A1* | 1/2007 | Allen et al. | 455/518 |
| 2007/0184867 A1* | 8/2007 | Son | H04W 76/005 455/518 |
| 2007/0189301 A1* | 8/2007 | Kiss | H04L 65/1016 370/395.2 |
| 2007/0270104 A1* | 11/2007 | Allen | H04W 76/005 455/78 |
| 2008/0034078 A1* | 2/2008 | Sano et al. | 709/223 |
| 2008/0037574 A1* | 2/2008 | Huh | H04L 65/4061 370/416 |
| 2008/0134213 A1* | 6/2008 | Alverson | G06F 11/0709 719/318 |
| 2008/0184260 A1* | 7/2008 | Grayson | 719/313 |
| 2008/0208953 A1 | 8/2008 | Tian | |

FOREIGN PATENT DOCUMENTS

| | | |
|---|---|---|
| JP | 2003-309664 | 10/2003 |
| JP | 2006-238112 | 9/2006 |
| KR | 1020040000465 | 1/2004 |
| KR | 1020070034069 | 3/2007 |
| KR | 1020070037748 | 4/2007 |
| KR | 1020070045133 | 5/2007 |
| WO | WO 2007/048339 | 5/2007 |

OTHER PUBLICATIONS

Korean Office Action dated Oct. 17, 2014 issued in counterpart application No. 10-2008-0009423.
Chinese Office Action dated Dec. 3, 2014 issued in counterpart application No. 201210571356.1.

* cited by examiner

SYSTEM AND METHOD FOR CONTROLLING SIP-SPECIFIC EVENT NOTIFICATION ACCORDING TO PREFERENCE OF SUBSCRIBER

PRIORITY

This application claims priority under 35 U.S.C. §119(a) to applications filed in the Korean Industrial Property Office on Aug. 21, 2007 and assigned Serial No. 2007-83984, and filed on Jan. 22, 2008 and assigned Serial No. 2008-6876, the contents of which are incorporated herein by reference.

BACKGROUND OF THE INVENTION

1. Field of the Invention

The present invention relates to a system and a method for Session Initiation Protocol (SIP)-specific notification (i.e. SIP-based notification) corresponding to an event subscription. Particularly, the present invention relates to the improvement of a method for notification corresponding to an event subscription. Also, the present invention relates to the improvement of a system and a method for notifying a presence event in order to forward presence information in a presence system, by using the system and the method as described above.

2. Description of the Related Art

"SIP-Specific Event Notification" identified by RFC (Request for Comments) 3265 of IETF (Internet Engineering Task Force) describes a method for forwarding a state of a particular event by using an SIP SUBSCRIBE and an SIP NOTIFY.

FIG. 1 is a flow diagram illustrating an SIP-specific event notification (i.e. SIP-based event notification) method. Referring to FIG. 1, when a user desires to keep up with the latest information on the state of a particular event (i.e. the latest state information on a particular event), he/she subscribes to the relevant event as a subscriber. A subscription target having state information on the relevant event continues to notify the subscriber of the latest state information on the relevant event in response to a request of the subscriber.

FIG. 2 is a flow diagram illustrating a typical example of a signaling flow in the SIP-specific event notification method according to the RFC3265. As described above, the subscriber forwards a SUBSCRIBE request to the subscription target with respect to a event named "foo". The subscription target determines if the subscriber can subscribe to the "foo" event. When the subscriber requesting subscription to the "foo" event is authorized, a current state of the "foo" event that the subscription target knows of is forwarded to the subscriber by using a NOTIFY Subsequently, whenever a state of the "foo" event is updated, the most recently updated state of the "foo" event is forwarded to the subscriber by using a NOTIFY.

A presence service requests and forwards presence information by using the SIP-specific event notification technology as described above. To this end, "a Presence Event Package for the SIP" identified by RFC3856 defines a presence event package. Herein, the presence event becomes the presence information. Referring to FIG. 3, a watcher can request presence information of a presentity through a subscription to the presence event. The presence information of the presentity is forwarded to a presence server of the presentity (i.e. a presentity's presence server) which maintains the presence information of the presentity. Through a series of notifications of presence events, the presence server forwards the presence information of the presentity and updated presence information thereof to the watcher.

FIG. 4 is a flow diagram showing a typical example of a signaling flow of requesting and forwarding presence information by using a presence event package. In FIG. 4, the watcher, the presence server of the presentity, and the event correspond to the subscriber, the subscription target, and "foo" as illustrated in FIG. 2, respectively. Accordingly, as in the process illustrated in FIG. 2, the watcher makes a request for a subscription to the presence event to the presence server of the relevant presentity in order to receive the presence information of the presentity. The presence server of the relevant presentity authorizes the subscription request, and then continues to notify the watcher of the most recently updated presence information on the relevant presentity.

By expanding the scheme for providing a presence service on one presentity as described above, the watcher can simultaneously subscribe to presence services on multiple presentities. To this end, the watcher subscribes to a presence service on a presence list by using a Resource List Server (RLS). The term "presence list" refers to a set of multiple presentities. By subscribing to the presence service on the presence list, the watcher can simultaneously subscribe to presence information on the multiple presentities.

FIG. 5 is a flow diagram illustrating the process of subscribing to the presence service on the presence list. In FIG. 5, if the watcher requests a subscription to the presence list, the subscription request is forwarded to the RLS. The RLS resolves the relevant presence list, and subscribes to a presence service on each of the members on the presence list for the watcher. Thereafter, the RLS receives the presence of each presentity, aggregates the received presences, and simultaneously forwards the aggregated presences to the watcher. By doing this, without the need for a subscription to a presence service on each of the multiple presentities, the watcher can simultaneously obtain the presence information on the multiple presentities.

In the SIP-specific event notification technology as described above, whenever an event is updated, relevant notification is generated in order to forward the updated event. Accordingly, the requirements of a system need to become more sophisticated in order to forward and process each generated notification.

Especially, in the case of a presence service provided by using the presence event package, when considering multiplicity of the watchers and presentities and the fact that the presence information is frequently updated, a traffic load becomes unbearably high due to the notification of a presence event generated whenever the presence information on each presentity is updated.

As a result, there has been an urgent need for a scheme capable of effectively reducing the SIP-specific event notification, especially, a volume of the presence event notifications.

SUMMARY OF THE INVENTION

Accordingly, the present invention has been made to solve the above-stated problems occurring in the prior art, and the present invention provides a system and method for controlling a volume of event notifications forwarded to a subscriber according to a preference of the subscriber in the SIP-specific event notification technology.

In accordance with an aspect of the present invention, there is provided a system for controlling Session Initiation Protocol (SIP)-specific event notification according to a preference of a subscriber, the system including the subscriber requesting an event subscription through an event notification controller; a subscription target for notifying the subscriber of an event through the event notification controller in response to the event subscription request; and the event notification controller for controlling whether the event notification is forwarded to the subscriber according to preference rules of the subscriber on event notifications.

In accordance with another aspect of the present invention, there is provided a method for controlling Session Initiation Protocol (SIP)-specific event notification according to a preference of a subscriber, the method including forwarding an event subscription request to a subscription target through an event notification controller by the subscriber; forwarding event notification to the event notification controller in response to the event subscription request by the subscription target; and forwarding the event notification received from the subscription target to the subscriber according to previously stored preference rules of the subscriber on event notifications by the event notification controller.

BRIEF DESCRIPTION OF THE DRAWINGS

The above and other exemplary features, aspects, and advantages of the present invention will be more apparent from the following detailed description taken in conjunction with the accompanying drawings, in which.

DETAILED DESCRIPTION OF THE PREFERRED EMBODIMENTS

Figure 1:
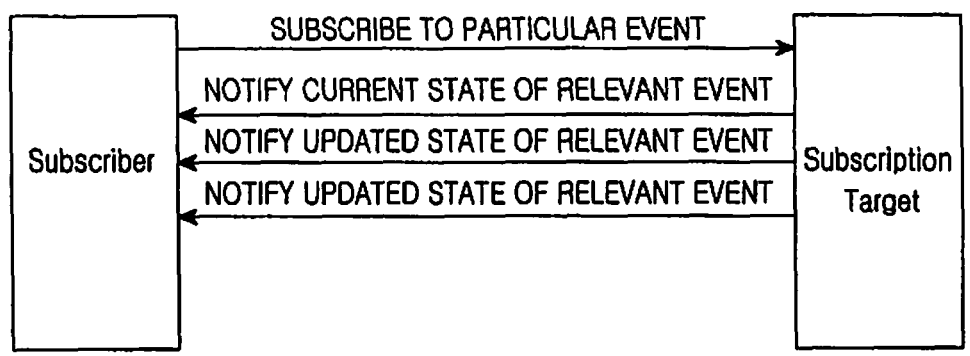
FIG. 1 is a flow diagram illustrating an SIP-specific event notification in RFC3265 according to the prior art.

Hereinafter, preferred embodiments of the present invention will be described in detail with reference to the accompanying drawings. Regarding the same configuration elements in the accompanying drawings, it should be noted that the same configuration elements will be designated by the same reference numerals in the following description and drawings although they are shown in different drawings. Also, in the following description of the present invention, a detailed description of known functions and configurations incorporated herein will be omitted when it may make the subject matter of the present invention rather unclear.

Figure 6:
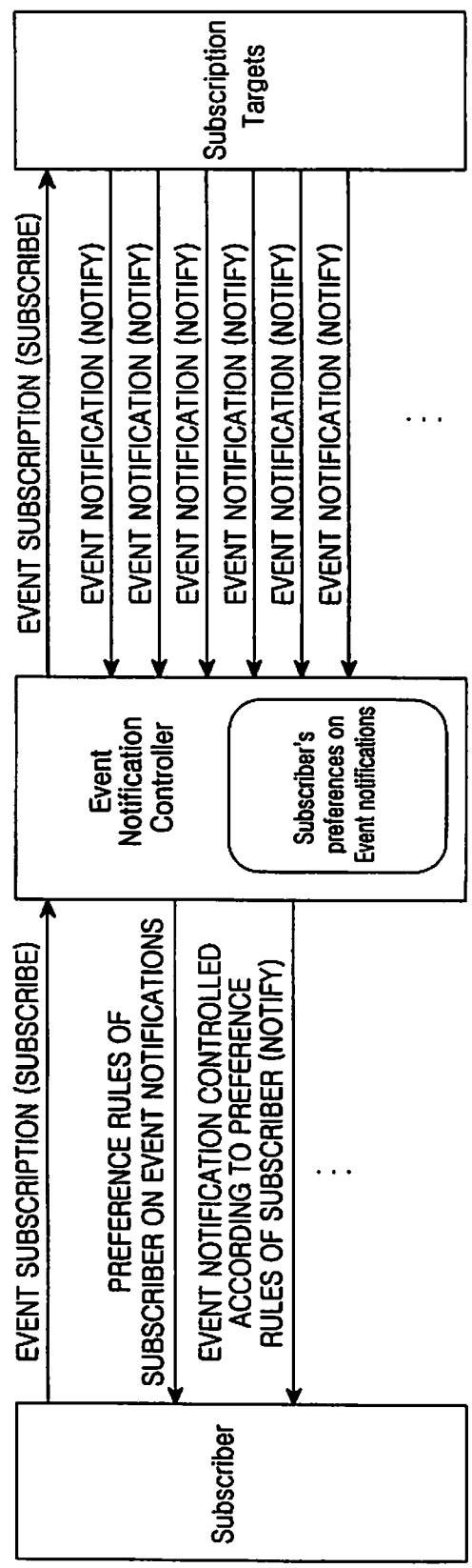
FIG. 6 a flow diagram illustrating a system and a method for controlling event notification according to a subscriber preference.

FIG. 6 is a flow diagram illustrating a system and a method for controlling event notifications according to a subscriber preference provided in the present invention. A subscriber requests an event subscription through an event notification controller. Then, if the subscriber desires to receive the event notifications, the event notification controller forwards the event notifications received from subscription targets to the subscriber according to the preference items (e.g., the subscriber desires to receive the event notifications by a particular period of time) of the subscriber on the event notifications, thereby controlling the event notifications to the subscriber.

Since the event notification controller controls the event notifications to the subscriber according to the preference of the subscriber on the event notifications, the subscriber needs to forward the preference rules of the subscriber on event notifications to the event notification controller. To this end, the present invention provides three methods as follows according to FIGS. 7A-7C.

Figure 7A:
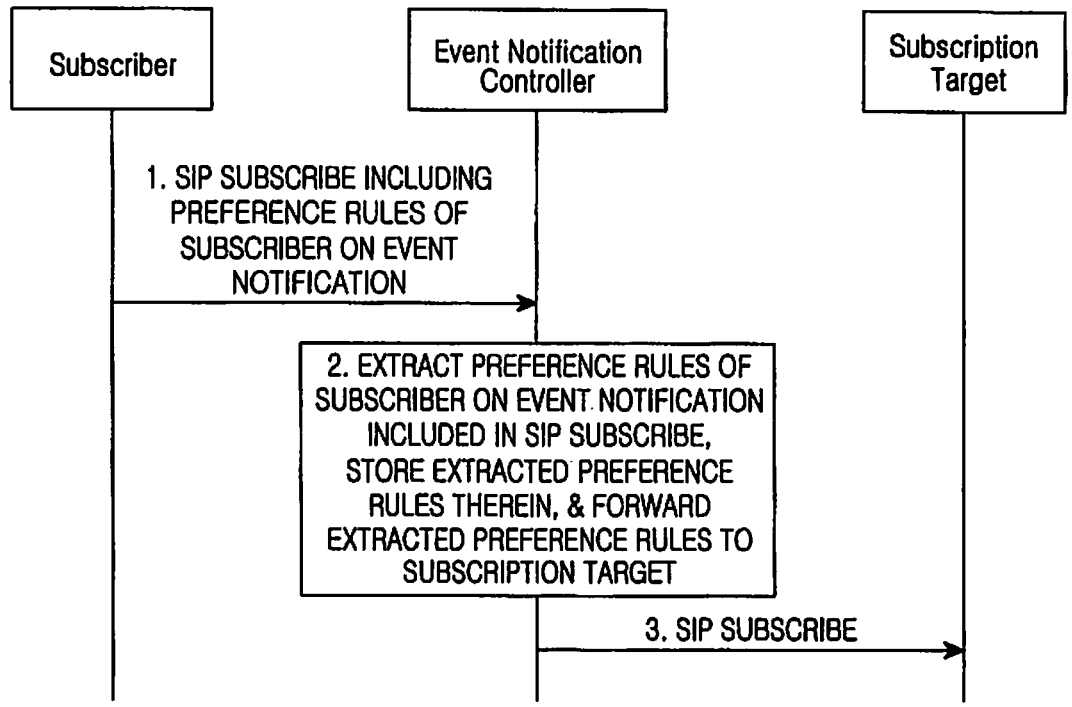
FIG. 7A is a flow diagram illustrating a method for forwarding the preference rules of a subscriber on the event notifications to an event notification controller.

FIG. 7A is a flow diagram illustrating the first method. Referring to FIG. 7, the subscriber includes the preference rules of the subscriber on event notifications in a subscription to a relevant event, and then the subscription is forwarded to the event notification controller in step 1. As described above, the event subscription of the subscriber is achieved by forwarding the event subscription to the subscription target through the event controller. Accordingly, if the subscriber includes the preference rules of the subscriber on event notifications in an SIP SUBSCRIBE, the event controller extracts the relevant preference rules on the event notifications from the SIP SUBSCRIBE and stores the extracted preference rules therein in step 2, and then forwards the SIP SUBSCRIBE to the subscription target in step 3.

Figure 7B:
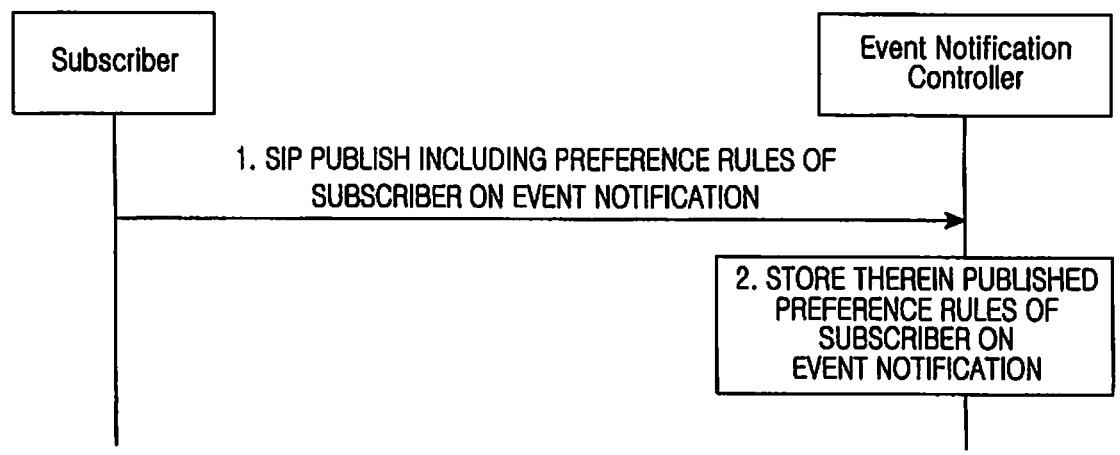
FIG. 7B is a flow diagram illustrating another method for forwarding the preference rules of the subscriber on event notifications to the event notification controller.
Figure 7C:
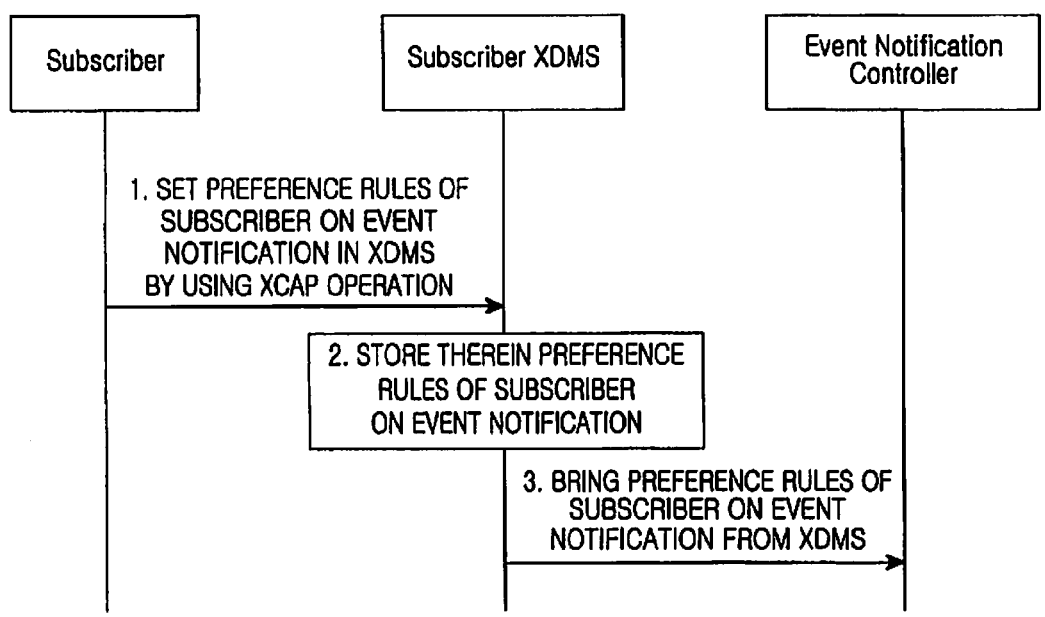
FIG. 7C is a flow diagram illustrating further another method for forwarding the preference rules of the subscriber on event notifications to the event notification controller.

FIG. 7B is a flow diagram illustrating the second method. Referring to FIG. 7B, the subscriber directly forwards the preference rules of the subscriber on event notifications to the event notification controller by using a separate SIP PUBLISH in step 1. FIG. 7C is a flow diagram illustrating the third method. In the third method, there is provided an eXtensible Markup Language (XML) Document Management Server (XDMS) capable of storing several preference rules of a subscriber. Also, in the third method, the subscriber stores the preference rules of the subscriber on event notifications in the XDMS by using an operation according to RFC4825 entitled "the XML Configuration Access Protocol (XCAP)" (i.e. an XCAP operation), and the event controller brings the relevant preference rules from the XDMS. Referring to FIG. 7C, the subscriber sets the preference rules of the subscriber on event notification in XDMS by using the XCAP operation, in step 1. In step 2, the subscriber XDMS stores the received preference rules. Then, in step 3, the subscriber XDMS brings the preference rules of the subscriber on event notification to the event notification controller.

Figure 2:
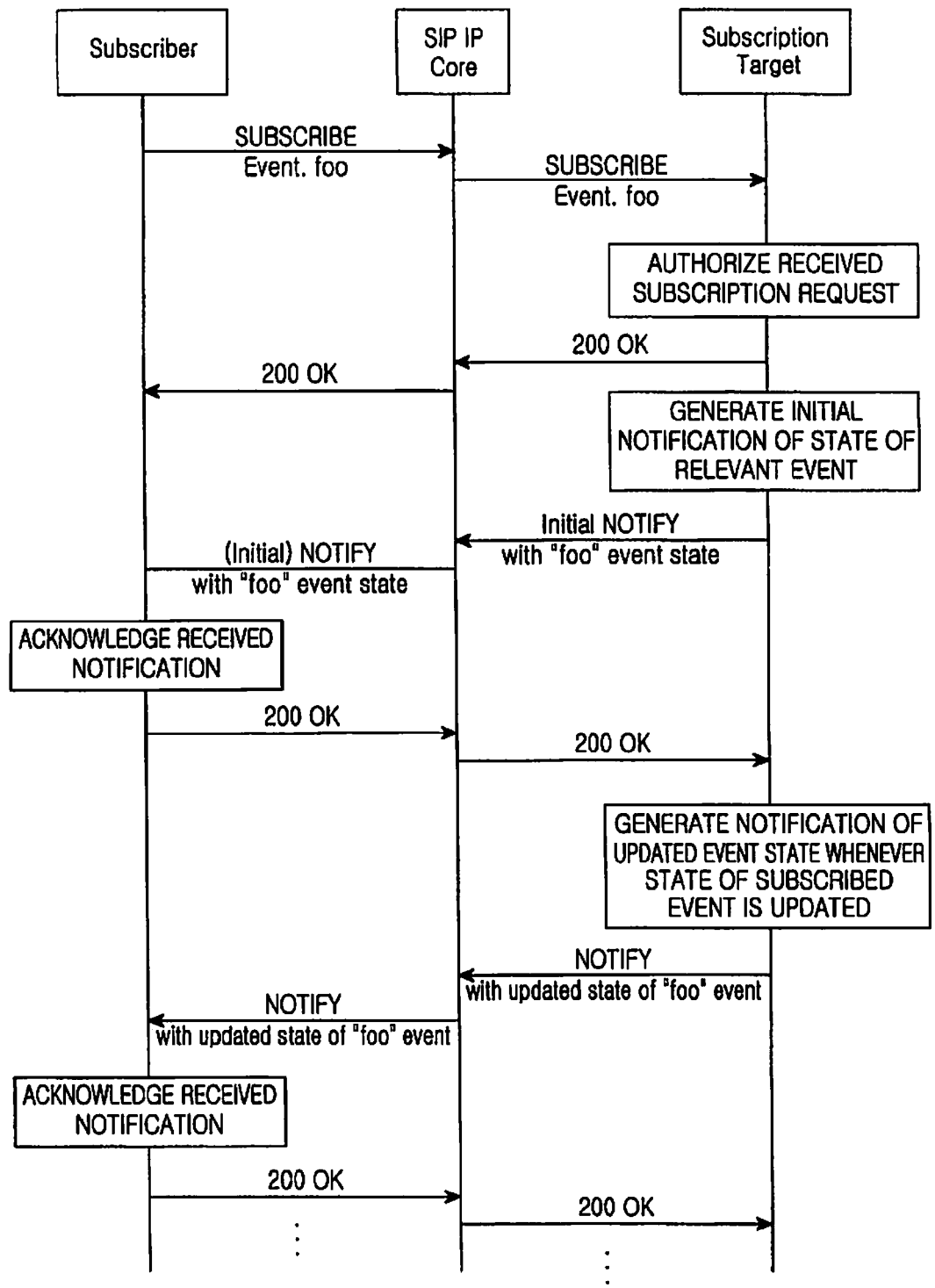
FIG. 2 is a flow diagram illustrating a signaling flow of the SIP-specific event notification in the RFC3265 according to the prior art.
Figure 3:
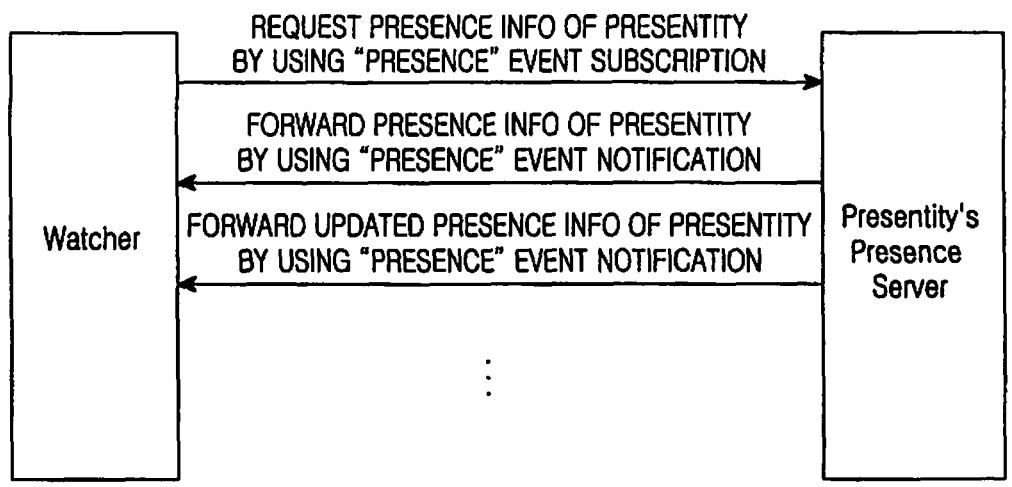
FIG. 3 is a flow diagram illustrating the process of providing a presence service by using "presence" event notification according to the prior art.
Figure 4:
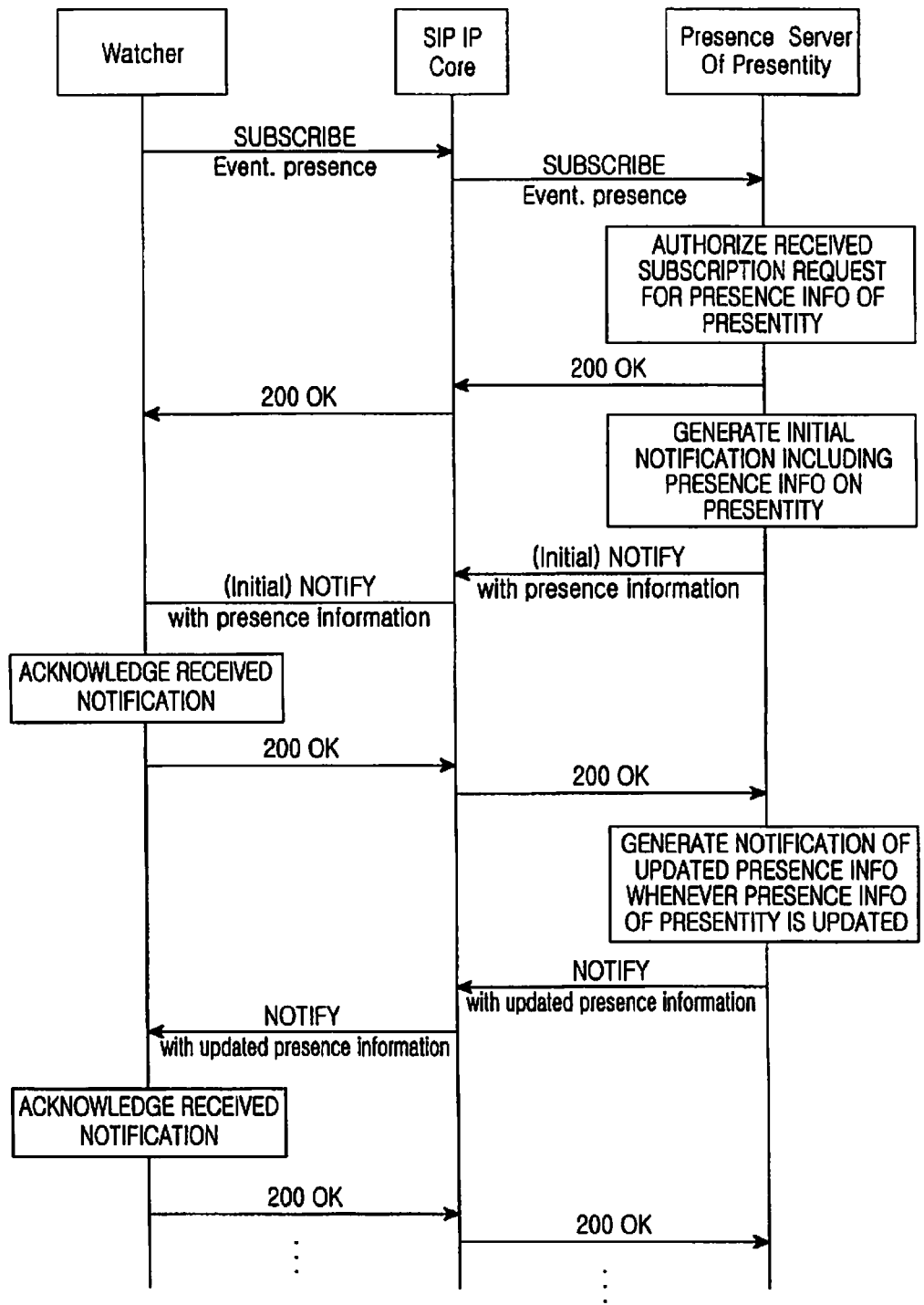
FIG. 4 is a flow diagram illustrating a signaling flow of providing a presence service by using a "presence" event package according to the prior art.
Figure 5:
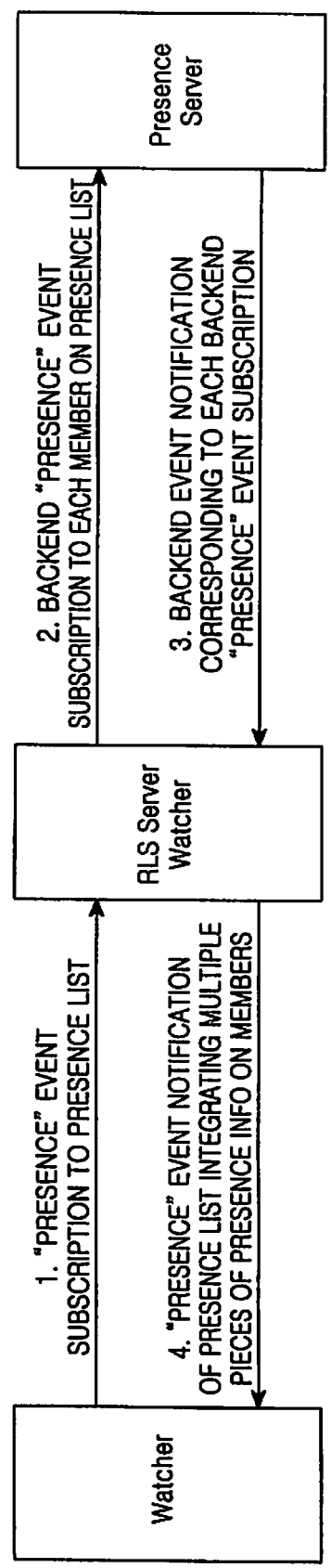
FIG. 5 is a flow diagram illustrating the process of providing a presence service on a presence list by using an RLS according to the prior art.
Figure 8:
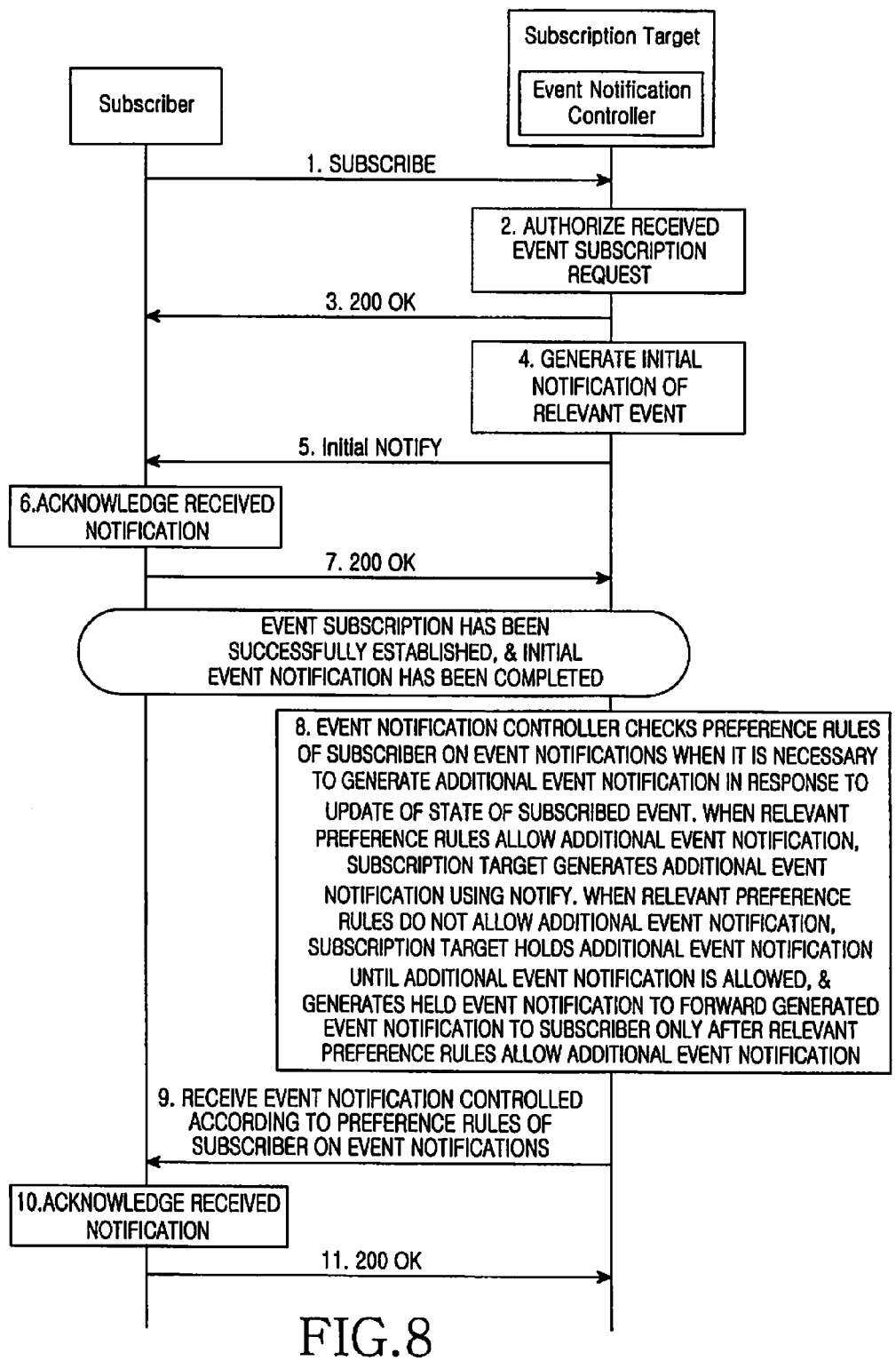
FIG. 8 is a flow diagram illustrating a preferred embodiment of an event notification controller when the event notification controller is included in a subscription target.

By using the preference rules of the subscriber on events proposed in the present invention, the subscriber can set up various preferences on the event notifications. For example, the subscriber may specify to receive event notifications only when a current state of the subscriber is a particular state. Likewise, the subscriber may set the preference rules of the subscriber on the events in such a manner that the subscriber can receive the event notifications only for a particular time zone. Other settings of the preference rules can also be prescribed. FIG. 8 is a flow diagram illustrating a preferred embodiment of a system and method for controlling event notifications according to a preference of the subscriber provided in the present invention when the event notification controller is included in the subscription target. In the embodiment, an event subscription process is performed between the subscriber and the subscription target as in the prior art shown in FIG. 2. However, other than forwarding an additional event notification whenever a state of a relevant event, i.e. an event state, is updated as set forth in the prior art, in the present invention, when it is necessary to forward an additional event notification in response to an updated state of a relevant event, the event notification controller existing within the subscription target checks the preference rules of the subscriber on event notifications forwarded in the process as shown in FIG. 7.

Then, the event notification controller generates the additional event notification to forward the generated event notification to the subscriber only when the checked preference rules currently allow the additional event notification. On the contrary, when the preference rules of the subscriber on event notifications do not currently allow the additional event notification, the event notification controller holds the additional event notification until the additional event notification is allowed by the preference rules.

In this state, when the preference rules of the subscriber on event notifications allow the additional event notification, the event notification controller forwards the held event notification to the subscriber in step 8 of FIG. 8. In conclusion, the subscriber receives event notification only when the event notification coincides with the preference rules of the subscriber on event notifications which are set by the subscriber, i.e. only when the subscriber prefers to receive the event notification in step 9 of FIG. 8.

The present invention provides that the event notification controller operates in either a non-proxy mode or a proxy mode when the event notification controller exists independent of the subscription target.

In the case of the event notification controller operating in the non-proxy mode, the event notification controller exists as an intermediate node on a path of an SIP session for an event subscription between the subscriber and the subscription target, and can control the event notification (i.e. an SIP NOTIFY) between the subscriber and the subscription target according to a preference of the subscriber.

In the case of the event notification controller operating in the proxy mode, the event notification controller separates an SIP session for the event subscription between the subscriber and the subscription target, and can control event notification (i.e. an SIP NOTIFY) between the subscriber and the subscription target according to a preference of the subscriber.

Figure 9A:
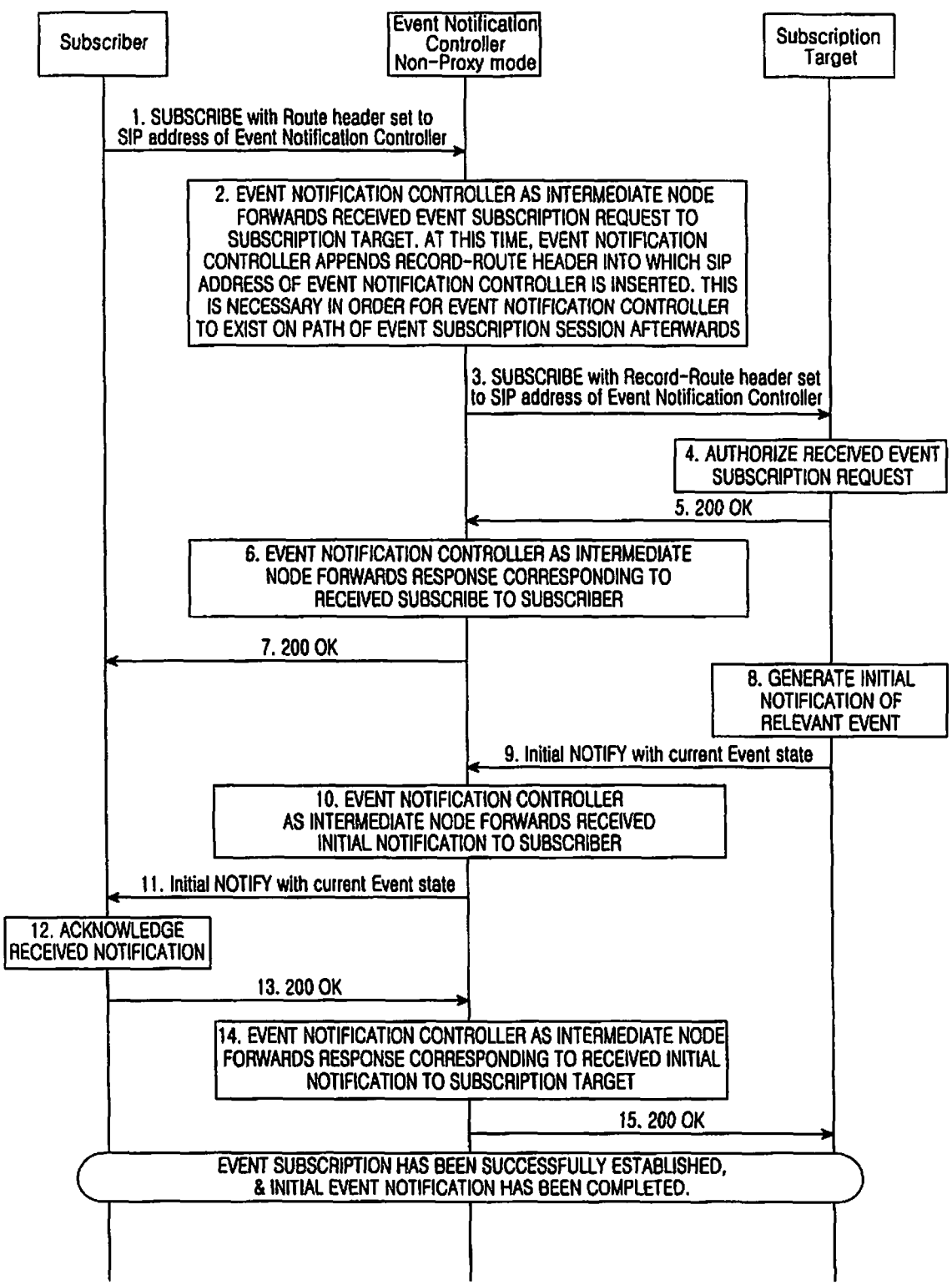
FIG. 9A is a flow diagram illustrating a preferred embodiment of a process for performing an event subscription when the event notification controller operates in a non-proxy mode.
Figure 9B:
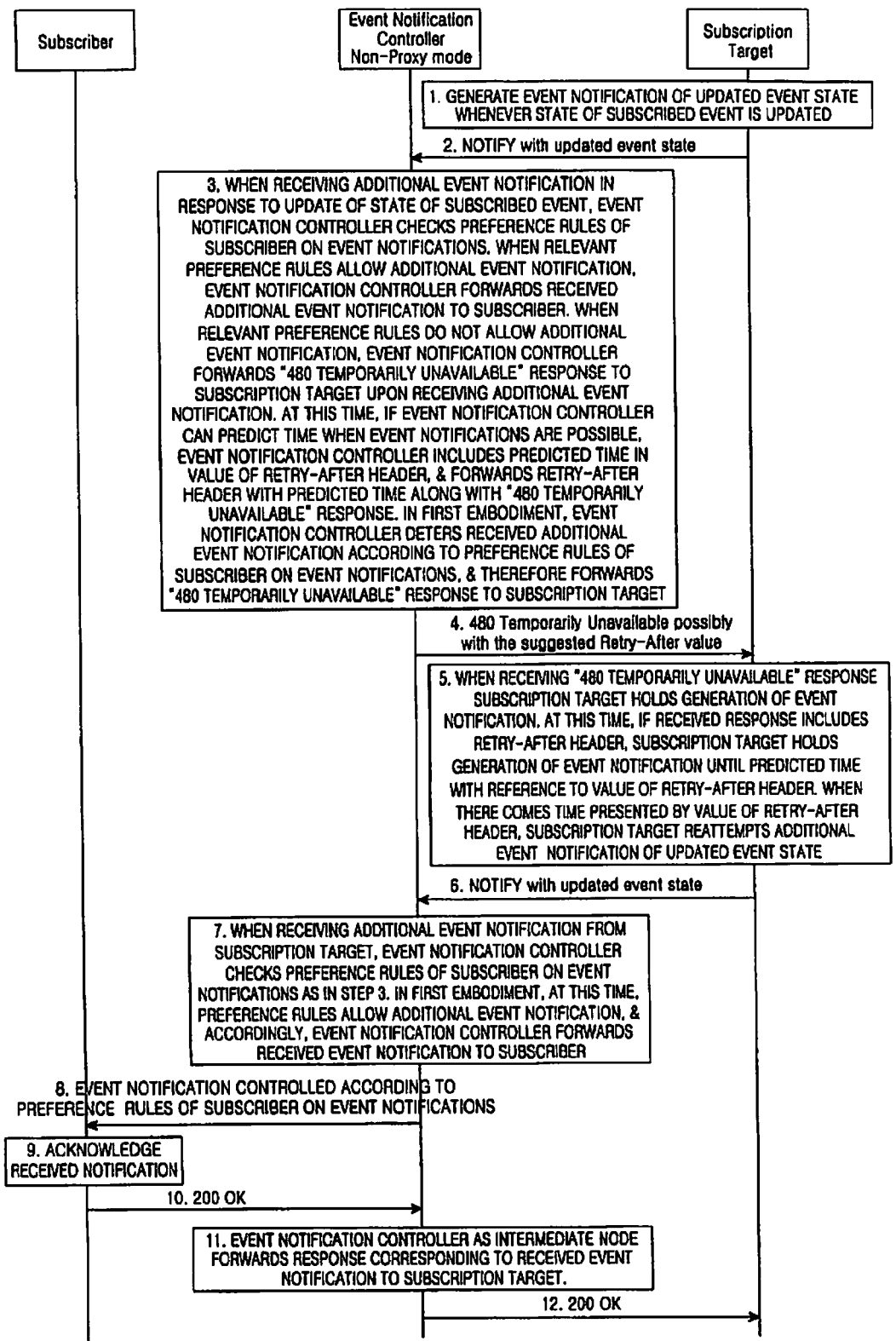
FIG. 9B is a flow diagram illustrating a first preferred embodiment of event notification control when the event notification controller operates in the non-proxy mode.
Figure 9C:
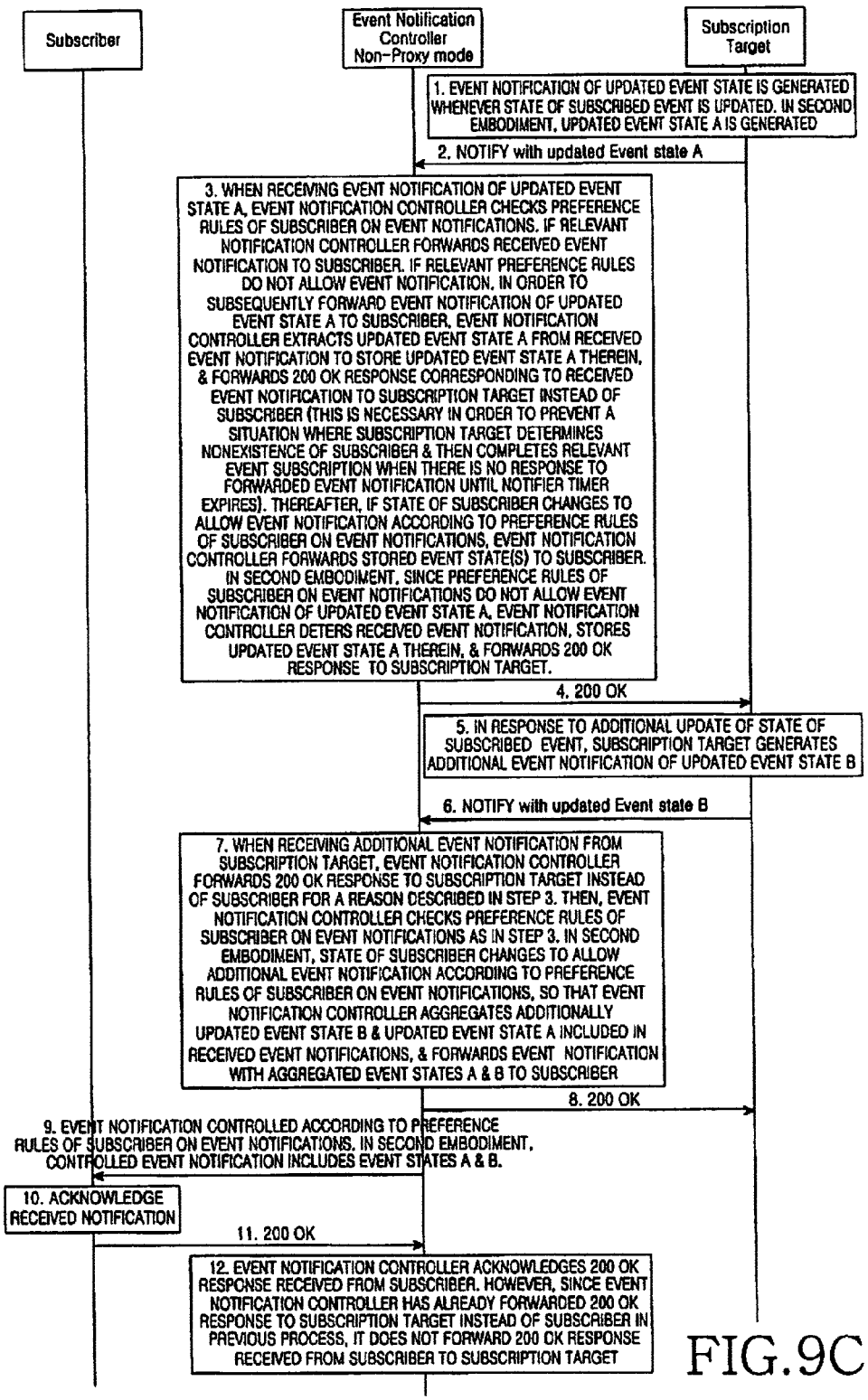
FIG. 9C is a flow diagram illustrating a second preferred embodiment of the event notification controller when the event notification controller operates in the non-proxy mode.

When the event notification controller operates in the non-proxy mode, the present invention provides that it operates as shown in FIGS. 9A, 9B, and 9C).

Referring to FIG. 9A, when the event notification controller operates in the non-proxy mode, the present invention provides that it is an intermediate node for an event subscription and event notifications. This provision can be implemented by inserting an SIP address of the event notification controller into a Route header, as defined in RFC3261 entitled "SIP: Session Initiation Protocol", when the subscriber subscribes to an event by using an SIP SUBSCRIBE as shown in step 1 of FIG. 9A, and by inserting the SIP address of the event notification controller into a Record-Route header, as defined in RFC3261 entitled "SIP: Session Initiation Protocol", when the event notification controller receiving the SIP SUBSCRIBE forwards the relevant SIP SUBSCRIBE to the subscription target in steps 2 and 3 of FIG. 9A). Otherwise, the SIP SUBSCRIBE of the subscriber can be first forwarded to the event notification controller according to the routing setting of an SIP network as a basis. Even in this case, the event notification controller appends the Record-Route header into which the SIP address of the event notification controller is inserted when forwarding the relevant SIP SUBSCRIBE to the subscription target.

The subscription target receiving the SIP SUBSCRIBE for the event subscription as described above authorizes if the subscriber has a right enabling a subscription to a relevant event in step 4 of FIG. 9A, and then forwards a 200 OK response to the event notification controller when the subscriber is authorized in step 5 of FIG. 9A. The 200 OK response is forwarded to the event notification controller due to the Record-Route header as described above in step 6 of FIG. 9A, and the event notification controller forwards the same 200 OK response as the received 200 OK response to the subscriber in step 7 of FIG. 9A).

As in the prior art described above, the subscription target includes a current state of a relevant event in a body of an initial SIP NOTIFY, and forwards the initial SIP NOTIFY with the current event state, i.e. the initial SIP NOTIFY including the current event state, immediately after forwarding the 200 OK response in steps 8 and 9 of FIG. 9A. As described above, the initial SIP NOTIFY is forwarded to the event notification controller, and the event notification controller forwards the received initial SIP NOTIFY to the subscriber in steps 10 and 11 of FIG. 9A. Upon receiving the initial SIP NOTIFY, the subscriber forwards a 200 OK response to the subscription target through the event notification controller in steps 12, 13, 14, and 15 of FIG. 9A.

As such, when the event notification controller operates in the non-proxy mode, an event subscription in which the event notification can be controlled is achieved.

Further, the present invention provides that the event notification controller operating in the non-proxy mode controls event notifications as follows.

In the case of the event notification controller operating in the non-proxy mode, the event notifications can be implemented in two different methods in FIGS. 9B and 9C.

In the first embodiment illustrated in FIG. 9B, if an event state is updated, the subscription target includes the updated state of the relevant event in an SIP NOTIFY, and forwards the SIP NOTIFY with the updated event state in steps 1 and 2 of FIG. 9B. The SIP NOTIFY is forwarded to the event notification controller as performed in the process shown in FIG. 9A.

Upon receiving the new event notification, the event notification controller checks the preference rules of the subscriber on event notifications which are set as in the process shown in FIG. 7. Accordingly, when a current state of the subscriber allows the new event notification according to the preference rules of the subscriber on event notifications, the event notification controller forwards the new event notification to the subscriber. Otherwise, the event notification controller does not forward the new event notification to the subscriber, but instead forwards a "480 Temporarily Unavailable" response, as defined in RFC3261 entitled "SIP: Session Initiation Protocol", to the subscription target.

At this time, the event notification controller may be able to predetermine the time the subscriber desires to receive the event notifications according to the preference rules of the subscriber on event notifications. For example, it can be noted that the event notifications are possible after one hour if the subscriber sets the preference rules in such a manner that the preference rules may allow the event notifications after one hour. In this case as illustrated above, the event notification controller sets the predetermined time when the event notifications are possible in a Retry-After header, as defined in RFC3261 entitled "SIP: Session Initiation Protocol", and forwards the Retry-After header with the predetermined time along with the "480 Temporarily Unavailable" response in step 3 of FIG. 9B. This is necessary to notify the subscription target as to when to generate the following event notification as show in step 3 of FIG. 9B.

The "480 Temporarily Unavailable" response is forwarded to the subscription target in step 4 of FIG. 9B, and the subscription target holds the generation of an event notification until the predetermined time with reference to the value of the Retry-After header in step 5 of FIG. 9B. Then, the subscription target re-generates an SIP NOTIFY with the updated event state in step 6 of FIG. 9B). As described above, the re-generated SIP NOTIFY with the updated event state is forwarded to the event notification controller. Then, the event notification controller checks the preference rules of the subscriber on event notifications, and forwards the relevant event notification to the subscriber when the preference rules allow the relevant event notification steps 7 and 8 shown of FIG. 9B. Upon receiving the relevant event notification, the subscriber forwards a 200 OK response to the subscription target through the event notification controller in steps 9, 10, 11, and 12 of FIG. 9B.

According to the first embodiment of the present invention as described above, the event notification controller operating in the non-proxy mode can control the event notifications according to a preference of the subscriber.

The present invention further provides a second embodiment of the event notification control using the event notification controller operating in the non-proxy mode as shown in FIG. 9C.

Referring to FIG. 9C, when the event subscription is achieved through the event notification controller operating in the non-proxy mode as illustrated in FIG. 9A and a state of a relevant event is then updated, e.g. an updated event state A, in step 1 of FIG. 9C, the subscription target includes the updated event of the relevant event in an SIP NOTIFY, and forwards the SIP NOTIFY with the updated event state to the event notification controller in steps 1 and 2 of FIG. 9C.

Upon receiving the SIP NOTIFY with the updated event state, the event notification controller checks the preference rules of the subscriber on event notifications, which are set in the process shown in FIG. 7, in step 3 of FIG. 9C. When it is checked that a current state of the subscriber allows the received event notification according to the preference rules of the subscriber on event notifications, the event notification controller forwards the relevant event notification, i.e. the received event notification, to the subscriber. Otherwise, the event notification controller first stores the updated event state therein in order to forward the updated event state through the relevant event notification when the relevant event notification to the subscriber is subsequently allowed. Then, the event notification controller forwards a 200 OK response to the subscription target instead of the subscriber. This is necessary in order to prevent a situation where the subscription target determines that a relevant event subscription no longer exists and then completes the relevant event subscription when there is no response for a predetermined period of time after forwarding the SIP NOTIFY in step 3 shown in FIG. 9C.

Also, when, in response to additional update of the event state, e.g. an updated event state B in step 5 of FIG. 9C, which subsequently occurs, the subscription target includes the updated state of the relevant event in an SIP NOTIFY, and forwards the SIP NOTIFY with the updated event state to the event notification controller, and the event notification controller checks the preference rules of the subscriber on event notifications as described above.

When it is checked that a current state of the subscriber does not allow the additional event notification according to the preference rules of the subscriber on event notifications, the event notification controller first stores the updated event state therein in order to forward the additionally updated event state through the additional event notification when the additional event notification to the subscriber are subsequently allowed. Then, the event notification controller forwards a 200 OK response to the subscription target instead of the subscriber in steps 5, 6, 7, and 8 of FIG. 9C).

Thereafter, when a state of the subscriber changes to allow the additional event notification according to the preference rules of the subscriber on event notifications, the event notification controller aggregates previously stored updated event states, e.g. the updated event states A and B, and forwards event notification of the aggregated updated event states to the subscriber in steps 7 and 9 of FIG. 9C). Upon receiving the event notification of the aggregated updated event states, the subscriber forwards a 200 OK response to the event notification controller. However, the event notification controller has already forwarded the 200 OK response to the subscription target instead of the subscriber, and therefore ignores the 200 OK response forwarded thereto in steps 10, 11, and 12 shown of FIG. 9C. According to the second embodiment of the present invention as described above, event notifications can be controlled according to a preference of the subscriber by using the event notification controller operating in the non-proxy mode.

The present invention provides that the event notification controller should separate an SIP session for an event subscription between the subscriber and subscription target when the event notification controller operates in the proxy mode, thereby controlling event notification, i.e. an SIP NOTIFY, between the subscriber and subscription target according to a preference of the subscriber. Namely, the present invention provides that the event notification controller should operate as a Back-TO-Back User Agent, as defined in RFC3261 entitled "SIP: Session Initiation Protocol, between the subscriber and subscription target, thereby establishing one event subscription session between the subscriber and the event notification controller, and a backend event subscription session between the event notification controller and the subscription target with respect to a relevant event along with the establishment of the one event subscription session.

In the case of the event notification controller operating in the non-proxy mode, there is one SIP session for an event subscription between the subscriber and subscription target, and the event notification controller operating in the non-proxy mode acts as a forwarding node for event subscription messages between the subscriber and the subscription target. However, in the case of the event notification controller operating in the proxy mode, one SIP session for an event subscription is established between the subscriber and the event notification controller, and a separate SIP session for an event subscription is established between the event notification controller operating in the proxy mode and the subscription target. Accordingly, it can be noted that the event notification controller operating in the proxy mode works in a different way from when the event notification controller operating in the non-proxy mode.

Figure 10A:
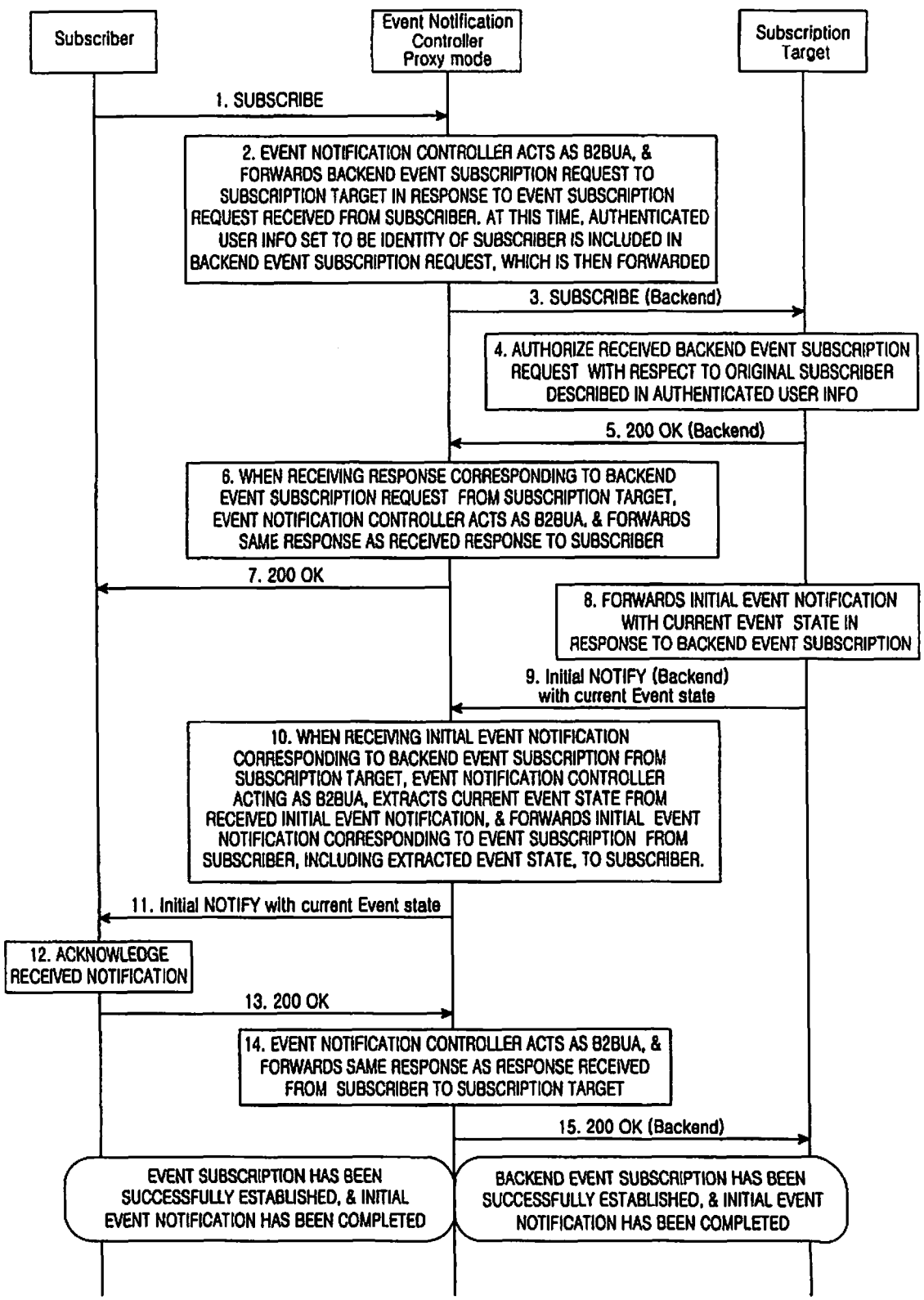
FIG. 10A is a flow diagram illustrating a preferred embodiment of a process for performing an event subscription when the event notification controller operates in a proxy mode.
Figure 10B:
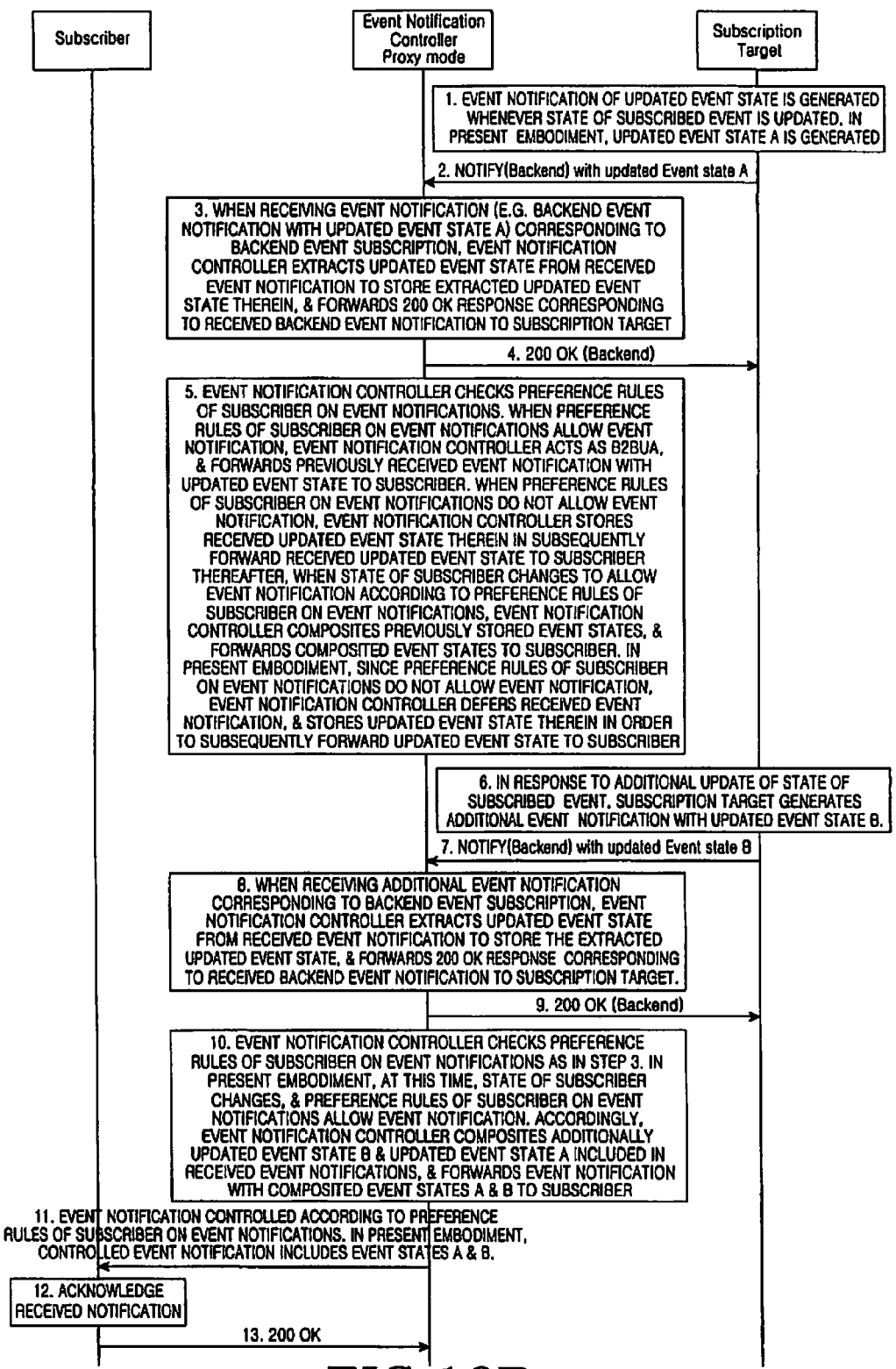
FIG. 10B is a flow diagram illustrating a preferred embodiment of event notification control when the event notification controller operates in the proxy mode.

The present invention provides an event notification control process of the event notification controller operating in the proxy mode as shown in FIGS. 10A and 10B.

Referring to FIG. 10A, an event subscription request of the subscriber using an SIP SUBSCRIBE is forwarded to the event notification controller with the event notification controller as a terminal of the event subscription request in step 1 of FIG. 10A). Accordingly, the event notification controller acts as a B2BUA, and makes a request for a backend event subscription to the relevant event to the subscription target in steps 2 and 3 of FIG. 10A). At this time, by describing an original user as an authenticated user in the backend event subscription request, the event notification controller can indicate that the relevant backend event subscription is performed for the relevant subscriber in steps 2 and 3 of FIG. 10A. The authenticated user information in the SIP request can be represented by using a P-Asserted-Identity header, as defined by RFC3325 entitled "Private Extension to the SIP for Asserted Identity within Trusted Networks", or by using other methods not described herein. The representation of the authenticated user information will not be described in further detail in the present invention.

The subscription target receives the backend event subscription request from the event notification controller, and performs service authentication on the relevant event with respect to the original described in the authenticated user information in the received backend event subscription request in step 4 of FIG. 10A. If the service authentication on the relevant event is authenticated, the subscription target forwards a 200 OK response corresponding to the backend event subscription request to the event notification controller in step 5 of FIG. 10A. The event notification controller as a B2BUA receives the 200 OK response corresponding to the backend event subscription request from the subscription target, and forwards the same 200 OK response as the received 200 OK response to the subscriber in response to the event subscription request from the subscriber as described above in steps 6 and 7 of FIG. 10A.

As in the prior art described above, immediately after forwarding the 200 OK response, the subscription target includes a current state of the relevant event in a body of an initial SIP NOTIFY, and forwards the initial SIP NOTIFY with the current event state to the event notification controller in steps 8 and 9 of FIG. 10A). The event notification controller as the B2BUA receives the initial SIP NOTIFY corresponding to the backend event subscription from the subscription target, and forwards the same SIP NOTIFY as the received SIP NOTIFY to the subscriber in response to the event subscription from the subscriber as described above in steps 10 and 11 of FIG. 10A.

Upon receiving the initial SIP NOTIFY corresponding to the event subscription, the subscriber forwards a 200 OK response to the event notification controller in steps 12 and 13 of FIG. 10A. Upon receiving the 200 OK response, the event notification controller as the B2BUA forwards a 200 OK response to the subscription target in reply to the initial SIP NOTIFY corresponding to the previous backend event subscription in steps 14 and 15 of FIG. 10A.

With this, the event subscription can be achieved in which the event notifications can be controlled by using the event notification controller operating in the proxy mode.

When the event notification controller operates in the proxy mode, as described above, after the event subscription in which the event notifications can be controlled is achieved, the present invention provides that the event notification controller operating in the proxy mode controls event notifications as shown in FIG. 10B.

Referring to FIG. 10B, when an event state is updated, e.g. an updated event state A in step 1 of FIG. 10B, the subscription target includes the updated state of the relevant event in an SIP NOTIFY, and forwards the SIP NOTIFY with the updated event state to the event notification controller in steps 1 and 2 of FIG. 10B.

Upon receiving the SIP NOTIFY corresponding to the backend event subscription, the event notification controller extracts the updated event state from the received SIP NOTIFY to store the extracted updated event state therein, and forwards a backend 200 OK response corresponding to the received backend SIP NOTIFY to the subscription target in steps 3 and 4 of FIG. 10B. In order to determine if the event notification controller notifies the subscriber of the updated event state, the event notification controller storing the updated event state therein checks the preference rules of the subscriber on event notifications, which are set in the process as shown FIG. 7, as in step 3 of FIG. 9B and that of FIG. 9C in the case of the event notification controller operating in non-proxy mode.

When it is checked that a current state of the subscriber allows the event notification, e.g. the backend event notification of the updated event state A, according to the preference rules of the subscriber on event notifications, the event notification controller includes the received updated event state in a body of an SIP NOTIFY corresponding to the event subscription from the subscriber as described above, and forwards the SIP NOTIFY to the subscriber. On the contrary, if the current state of the subscriber does not allow the event notification according to the preference rules of the subscriber on event notifications, the event notification controller first stores the updated event state therein in order to forward the updated event state when the event notification to the subscriber is subsequently allowed in step 5 of FIG. 10B.

Thereafter, in response to an additional update of an event state, e.g. an updated event state B in step 6 of FIG. 10B, the subscription target includes the additionally updated state of the relevant event in a backend SIP NOTIFY, and then forwards the backend SIP NOTIFY with the additionally updated event state to the event notification controller in steps 6 and 7 of FIG. 10B). As described above, when receiving the backend SIP NOTIFY with the additionally updated event state, the event notification controller extracts the additionally updated event state from the backend SIP NOTIFY to store the extracted updated event state, and forwards a backend 200 OK response corresponding to the received backend SIP NOTIFY to the subscription target in steps 8 and 9 of FIG. 10B.

Thereafter, when a state of the subscriber changes to allow the event notification of the additionally updated event state according to the preference rules of the subscriber on event notifications, the event notification controller composites previously stored event states, includes the composited event states in a body of an SIP NOTIFY corresponding to the event subscription from the subscriber, and then forwards the SIP NOTIFY with the composited event states to the subscriber in steps 10 and 11 of FIG. 10B. Upon receiving the SIP NOTIFY with the composited event states, the subscriber forwards a 200 OK response to the event notification controller in steps 12 and 13 shown in FIG. 10B.

According to the embodiment of the present invention as described above, the event notifications can be controlled according to the preference rules of the subscriber on event notifications by using the event notification controller operating in the proxy mode.

As described above in the prior art, a presence service is implemented by a subscription to and the notification of a "presence" event defined by RFC 3856. Namely, making a request of a watcher for the presence service to a presentity is implemented by subscribing to the "presence" event, and presence information on the presentity is included in "presence" event notification, which is then forwarded to the watcher. Accordingly, the system and method for controlling the event notifications according to the preference rules of the subscriber on event notifications provided in the present invention can be applied to the presence service.

Figure 11:
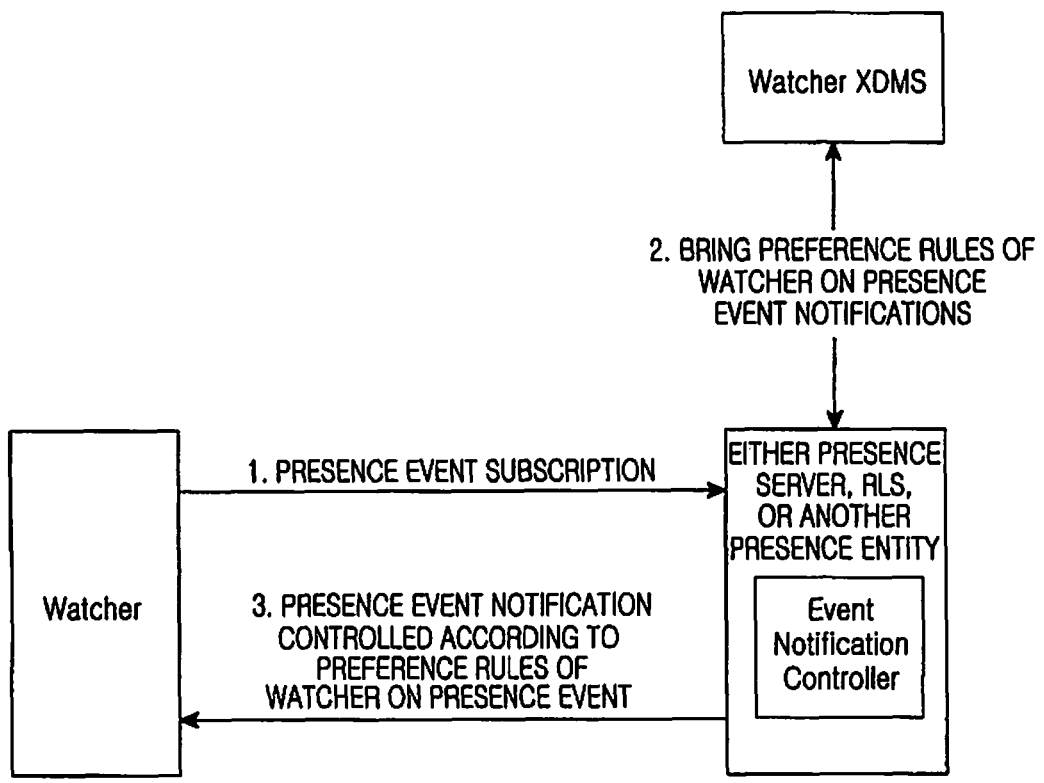
FIG. 11 is a view illustrating a preferred embodiment for controlling "presence" event notification according to the preference rules of a watcher on event notifications in a single domain presence system where the watcher and a presentity exist in the same domain.
Figure 12:
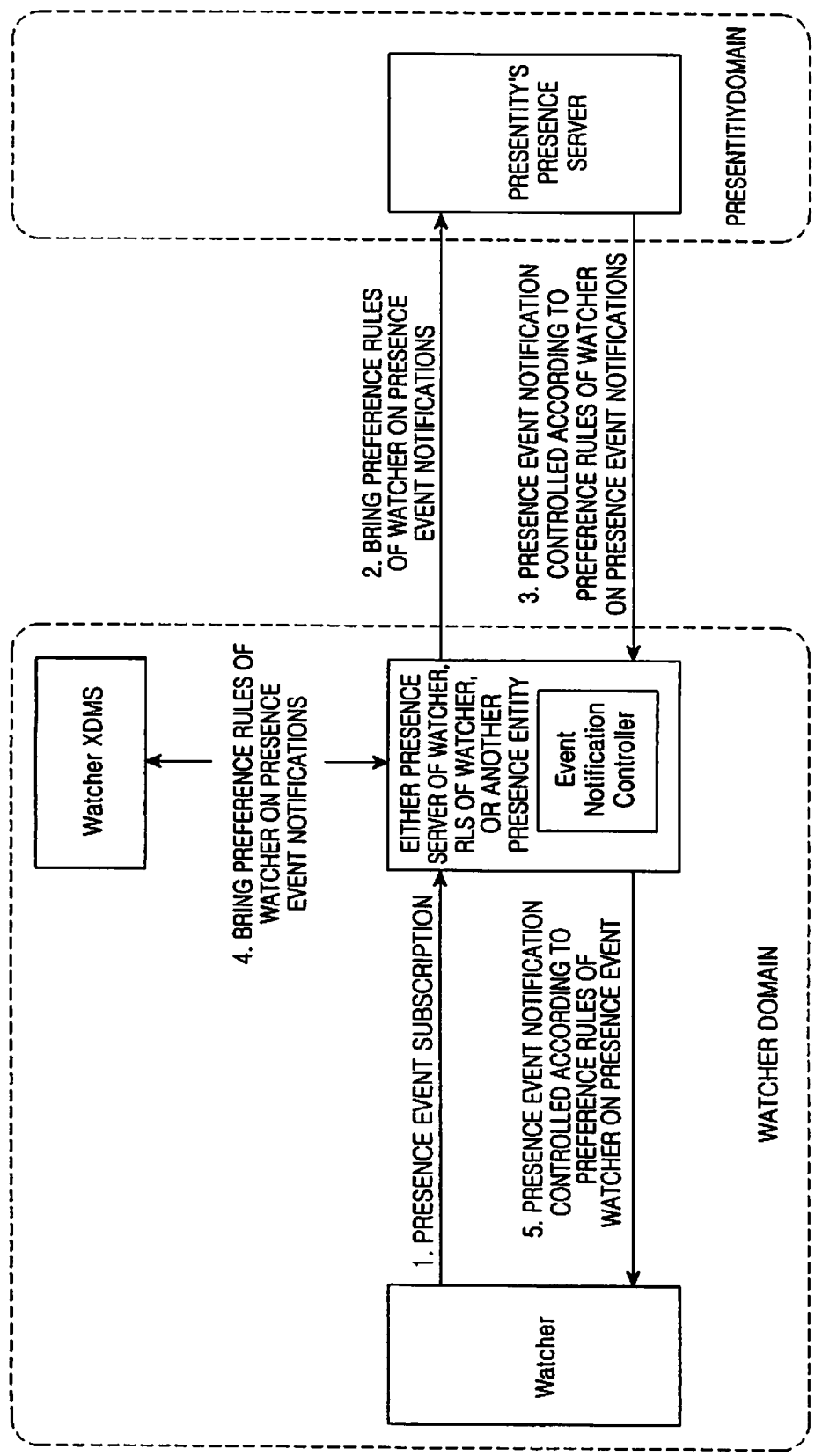
FIG. 12 is a view illustrating a preferred embodiment for controlling "presence" event notification according to the preference rules of a watcher on event notifications in a multi-domain presence system where the watcher and a presentity exist in different domains.

The present invention provides that, in a presence system, the control of event notifications according to the preference rules of a subscriber on the event notifications should be implemented as shown in FIGS. 11 and 12.

FIG. 11 illustrates an embodiment for controlling "presence" event notification according to the preference rules of a watcher on event notifications in a single domain presence system where the watcher and a presentity is in the same domain.

To this end, the present invention provides that the event notification controller as described above is either within a presence server, an RLS, or another presence entity in the single domain presence system. At this time, the watcher corresponds to a subscriber to the "presence" event, either the presence server, the RLS, or the other presence entity corresponds to a subscription target of the "presence" event. Accordingly, the present invention provides that either the presence server or the RLS should control the presence event notification to the watcher according to the preference rules of the watcher on the presence event notifications by using the event notification controller as described in FIG. 8. Also, the present invention provides that the watcher can set his/her own preference rules on the presence event notifications in one of the methods as described in FIG. 7. Also, the present invention provides a new system referred to as a "watcher XDMS" for a case where the watcher sets his/her own preference rules on the presence event notifications in the method as described in FIG. 7C.

More specifically, the watcher as the subscriber to the "presence" event requests a subscription to the "presence" event of the presentity, and the request is forwarded to either the presence server, the RLS, or the other presence entity in step 1 of FIG. 11. Either the presence server or the RLS forwards presence event notification, including presence information on the presentity, to the watcher in step 3 of FIG. 11 only when the watcher desires to receive presence event notification according to the preference rules of the watcher on the presence event notifications in step 2 of FIG. 11 by using the event notification controller as proposed in the present invention.

As such, the single domain presence system can control the presence event notification according to the preference rules of the watcher on the event notifications, and prevent the forwarding of unnecessary presence information that the watcher does not desire.

FIG. 12 illustrates an embodiment for controlling "presence" event notification according to the preference rules of a watcher on event notifications in a multi-domain presence system where the watcher and a presentity are in different domains.

To this end, the present invention provides that, in the multi-domain presence system, the event notification controller as described above is either within a presence server of the watcher, an RLS of the watcher, or another presence entity in a watcher domain. Accordingly, the watcher corresponds to a subscriber to the "presence" event, and one of the presence server of the watcher, the RLS of the watcher, and the other presence entity corresponds to the event notification controller. Also, a presence server of the presentity existing in a presentity domain corresponds to a subscription target of the "presence" event. Accordingly, the present invention provides that one of the presence server of the watcher, the RLS of the watcher, and the other presence entity in the watcher domain should act as the event notification controller as described in FIGS. 9A, 9B, 9C, 10A, and 10B, thereby controlling presence event notifications to the watcher according to the preference rules of the watcher on the presence event notifications. Also, the present invention provides that the watcher can set his/her own preference rules on the presence event notifications in one of the methods as described in FIG. 7, and provides a new system referred to as a "watcher XDMS" in the watcher domain for a case where the watcher sets his/her own preference rules on the presence event notifications using the method as described in FIG. 7C.

More specifically, the watcher, as a subscriber to the "presence" event, requests a subscription to the "presence" event of the presentity, and the request is forwarded to one of the presence server of the watcher, the RLS of the watcher, and the other presence entity in the watcher domain, which is implemented as the event notification controller in step 1 of FIG. 12. Upon receiving the presence event subscription request from the watcher, one of the presence server of the watcher, the RLS of the watcher, and the other presence entity in the watcher domain recognizes that the presentity and the watcher are in different domains, and forwards the presence event subscription request received from the watcher to the presence server of the presentity in step 2 of FIG. 12. The presentity server of the presentity forwards a presence event notification with presence information of the presentity to one of the presence server of the watcher, the RLS of the watcher, and the other presence entity in the watcher domain, which has requested the presence information of the presentity in step 3 of FIG. 12. Upon receiving the presence event notification with the presence information of the presentity, one of the presence server of the watcher, the RLS of the watcher, and the other presence entity in the watcher domain forwards the presence event notification with the presence information of the presentity to the watcher in step 5 of FIG. 12 only when the watcher desires to receive the presence event notification according to the preference rules of the watcher on the presence event notifications in step 4 of FIG. 12 by using the event notification controller provided in the present invention.

As such, the multi-domain presence system can control the presence event notification according to the preference rules of the watcher on the presence event notifications, and prevent the forwarding of unnecessary presence information that the watcher does not desire.

As described above, the system and the method provided in the present invention can effectively control the event notifications to the subscriber according to the preference rules of the subscriber on event notifications. Accordingly, the system and method of the invention can prevent the generation of unnecessary event notification that the subscriber does not desire.

While the invention has been shown and described with reference to certain preferred embodiments thereof, it will be understood by those skilled in the art that various changes in form and details may be made therein without departing from the spirit and scope of the invention. Therefore, the present invention must be defined not by the described embodiments thereof but by the appended claims and equivalents of the appended claims as set forth herein.

What is claimed is:

1. An event notification controller for controlling Session Initiation Protocol (SIP)-specific event notification according to a preference of a subscriber, the event notification controller comprising:
   a transceiver configured to receive an event subscription request from the subscriber; and
   a processor configured to control the transceiver to:
   forward the event subscription request to a subscription target in a presentity domain when recognizing that the event notification controller is in a different domain than the subscription target,
   receive an event notification from the subscription target if preference rules on event notification set by the subscriber allow the event notification, and
   forward the event notification received from the subscription target to the subscriber according to the preference rules,
   wherein the event notification controller is in a watcher domain, and
   wherein if the preference rules do not allow the event notification, the processor is further configured to request the subscription target to hold the event notification.

2. The event notification controller as claimed in claim 1, wherein the processor is further configured to control the transceiver to receive the event subscription request including the preference rules of the subscriber on the event notifications set by the subscriber, extracts the preference rules of the subscriber from the event subscription request, and stores the extracted preference rules therein.

3. The event notification controller as claimed in claim 1, wherein the processor is further configured to control the transceiver to receive an SIP PUBLISH including the preference rules of the subscriber on event notifications set by the subscriber, extracts the preference rules of the subscriber from the received SIP PUBLISH, and stores the extracted preference rules therein.

4. The event notification controller as claimed in claim 1, wherein the processor is further configured to control the transceiver to receive the preference rules of the subscriber on the event notifications forwarded by an eXtensible Markup Language (XML) Document Management Server (XDMS) of the subscriber, and stores the received preference rules therein.

5. The event notification controller as claimed in claim 1, wherein the event notification controller exists within the subscription target.

6. The event notification controller as claimed in claim 5, wherein,
   when the subscription target generates an event notification, the processor checks the preference rules of the subscriber on the event notifications and notifies the subscriber of an event according to the event notification to the subscription target.

7. The event notification controller as claimed in claim 1, wherein the event notification controller exists independently of the subscription target.

8. The event notification controller as claimed in claim 7, wherein the event notification controller operates in one of a proxy mode and a non-proxy mode.

9. The event notification controller as claimed in claim 8, wherein, if the event notification controller operates in the non-proxy mode, one SIP is established between the subscriber and the subscription target through the event notification controller.

10. The event notification controller as claimed in claim 8, wherein, if the event notification controller operates in the proxy mode, an SIP is established between the subscriber and the event notification controller, and a separate SIP is established between the event notification controller and the subscription target.

11. The event notification controller as claimed in claim 10, wherein,
   if the preference rules allow the event notification, the processor is further configured to control the transceiver to forward the event notification to the subscriber, and
   if the preference rules of do not allow the event notification, the processor is further configured to store the event notification in the event notification controller until the preference rules allow the event notification.

12. The event notification controller as claimed in claim 7, wherein,
   if the preference rules do not allow the event notification, the processor holds the event notification until the preference rules allow the event notification.

13. The event notification controller as claimed in claim 1, wherein the processor is further configured to control the transceiver to transmit a temporarily unavailable response to the subscription target if the preference rules do not allow the event notification, and check if the preference rules allow the event notification after a predetermined time.

14. The event notification controller as claimed in claim 1, wherein the event notification is forwarded according to the preference rules.

15. A method for controlling Session Initiation Protocol (SIP)-specific event notification according to a preference of a subscriber by an event notification controller, in a watcher domain, the method comprising:
  receiving an event subscription request from the subscriber;
  forwarding the event subscription request to a subscription target, in a presentity domain;
  receiving an event notification from the subscription target if preference rules on event notification set by the subscriber allow the event notification; and
  forwarding the event notification received from the subscription target to the subscriber, and
  wherein if the preference rules do not allow the event notification, the processor is further configured to request the subscription target to hold the event notification.

16. The method as claimed in claim 15, wherein receiving the event subscription request from the subscriber comprises:
  receiving the event subscription request including the preference rules of the subscriber on event notifications set by the subscriber;
  extracting the preference rules of the subscriber on the event notifications from the event subscription request; and
  storing the extracted preference rules in the event notification controller.

17. The method as claimed in claim 15, wherein receiving the event subscription request from the subscriber comprises:
  receiving an SIP PUBLISH including the preference rules of the subscriber on the event notifications set by the subscriber;
  extracting the preference rules of the subscriber on the event notifications from the SIP PUBLISH; and
  storing the extracted preference rules in the event notification controller.

18. The method as claimed in claim 15, wherein receiving the event subscription request from the subscriber comprises:
  receiving an SIP PUBLISH including the preference rules of the subscriber on the event notifications forwarded by an eXtensible Markup Language (XML) Document Management Server (XDMS) of the subscriber;
  extracting the preference rules of the subscriber on the event notifications from the SIP PUBLISH; and
  storing the extracted preference rules in the event notification controller.

19. The method as claimed in claim 18, wherein the preference rules are previously set and stored in the XDMS by an operation according to RFC4825 entitled "the eXtensible Markup Language (XML) Configuration Access Protocol (XCAP)", which is an XCAP operation, of the subscriber.

20. The method as claimed in claim 15, wherein, if event notification corresponds to presence event notification, the subscriber corresponds to a watcher, the subscription target corresponds to a presence server, and the event notification controller corresponds to one of the presence server, a Resource List Server (RLS), and a presence entity.

21. The method as claimed in claim 20, wherein,
  if the event notification corresponds to presence event notification, one of the presence server, the RLS, and the presence entity receives preference rules of the watcher on the event notifications, and notifies a presence event in response to a presence subscription request of the watcher according to the preference rules of the watcher.

22. The method as claimed in claim 15, wherein the event notification controller exists within the subscription target.

23. The method as claimed in claim 22, wherein,
  when the subscription target generates an additional event notification, the event notification controller checks the preference rules of the subscriber on the event notifications and notifies the subscriber of an event to the subscription target.

24. The method as claimed in claim 22, wherein,
  if the preference rules allow the event notification, the event notification controller forwards the event notification to the subscriber.

25. The method as claimed in claim 24, wherein,
  if the preference rules do not allow the event notification, the event notification controller stores the event notification in the event notification controller until the preference rules allow the event notification.

26. The method as claimed in claim 24, wherein,
  if the preference rules do not allow the event notification, the event notification controller holds the event notification until the preference rules allow the event notification.

27. The method as claimed in claim 15, wherein the event notification controller exists independently of the subscription target.

28. The method as claimed in claim 27, wherein the event notification controller operates in either a proxy mode or a non-proxy mode.

29. The method as claimed in claim 28, wherein, if the event notification controller operates in the non-proxy mode, one SIP is established between the subscriber and the subscription target through the event notification controller.

30. The method as claimed in claim 29, wherein the event notification controller forwards the event notification to the subscriber if the preference rules of the subscriber on event notifications allow the event notification, and the event notification controller requests the subscription target to hold the event notification if the preference rules of the subscriber on event notifications do not allow the event notification.

31. The method as claimed in claim 30, wherein,
  if the preference rules do not allow the event notification, the event notification controller requests the subscription target to hold the event notification.

32. The method as claimed in claim 28, wherein, if the event notification controller operates in the proxy mode, one SIP is established between the subscriber and the subscription target through the event notification controller.

33. The method as claimed in claim 32, wherein if the preference rules allow the event notification, the event notification controller forwards the event notification to the subscriber.

34. The method as claimed in claim 15, wherein if the preference rules do not allow the event notification, further comprising:
  transmitting a temporarily unavailable response to the subscription target; and
  checking if the preference rules allow the event notification after a predetermined time.

35. The method as claimed in claim 15, wherein the event notification is forwarded according to the preference rules.

36. A method for controlling a Session Initiation Protocol (SIP) specific event notification according to a preference of a subscriber by a watcher, the method comprising:
  generating preference rules for restricting an event notification;

transmitting a subscription request including the preference rules to a subscription target in a presentity domain; and receiving, when the subscription target sends an additional event notification to a presence server in a watcher domain, the additional event notification from the presence server in the watcher domain, in response to the subscription request when the preference rules currently allow the event notification.

37. The method as claimed in claim 36, wherein the event notification request is an SIP PUBLISH request.

38. The event notification controller as claimed in claim 37, wherein,
when the event notification corresponds to a presence event notification, the subscriber corresponds to the watcher, the subscription target corresponds to a presence server, and the event notification controller corresponds to one of the presence server, a Resource List Server (RLS), and a presence entity.

39. The event notification controller as claimed in claim 38, wherein,
if the preference rules allow the event notification, the processor is further configured to control the transceiver to forward the event notification to the subscriber.

40. The event notification controller as claimed in claim 39, wherein,
if the preference rules allow the event notification, the processor is further configured to control the transceiver to forward the event notification to the subscriber, and
if the preference rules do not allow the event notification, the processor is further configured to request the subscription target to hold the event notification.

41. The event notification controller as claimed in claim 39, wherein,
if the preference rules allow the event notification, the processor is further configured to control the transceiver to forward the event notification to the subscriber, and
if the preference rules do not allow the event notification, the processor is further configured to store the event notification in the event notification controller until the preference rules allow the event notification.

42. The event notification controller as claimed in claim 38, wherein,
if the event notification corresponds to the presence event notification, one of the presence server, the RLS, and the presence entity receives preference rules of the watcher on the event notifications, and notifies the presence event in response to a presence subscription request from the watcher according to the preference rules of the watcher.

43. The method as claimed in claim 36, wherein the subscriber specifies to receive event notifications only when the current state of the subscriber is defined by the subscriber.

44. The event notification controller as claimed in claim 36, wherein the preference rules are previously set and stored in the XDMS by an operation according to RFC4825 entitled "the eXtensible Markup Language (XML) Configuration Access Protocol (XCAP)", which is an XCAP operation, of the subscriber.

45. A method for controlling Session Initiation Protocol (SIP)-specific event notification according to a preference of a subscriber by a subscription target, the method comprising:

receiving an event notification restriction request restricting an event notification to the subscriber; and
restricting generation of the event notification to be provided to the subscriber until event notification restriction rules being set by the subscriber are satisfied.

46. The method as claimed in claim 45, wherein the event notification restriction rules comprise a predicted time when the event notification is possible.

47. The method as claimed in claim 45, wherein,
if the event notification is a presence event notification, the subscriber is a watcher and a target for receiving the event notification restriction request is a presence server.

48. The method as claimed in claim 45, wherein the event notification restriction request is generated by an event notification controller having received an event subscription request from the subscriber, according to the event notification restriction rules which are extracted from the event subscription request.

49. A method for controlling Session Initiation Protocol (SIP)-specific event notification according to a preference of a subscriber by an event notification controller, the method comprising:

receiving an event subscription request from a subscriber;
determining whether the event subscription request comprises event notification restriction rules being set by the subscriber;
extracting the event notification restriction rules; and
controlling an event notification to be forwarded from a subscription target to the subscriber according to the event notification restriction rules, and
wherein if the preference rules do not allow the event notification, the processor is further configured to request the subscription target to hold the event notification.

50. The method as claimed in claim 49, wherein controlling the event notification to be forwarded from the subscription target to the subscriber according to the event notification restriction rules comprises:

generating an event notification restriction request for restricting the event notification to be forwarded to the subscriber according to the event notification restriction rules; and
forwarding the event notification restriction request to the subscription target.

51. The method as claimed in claim 50, wherein the event notification restriction request comprises a predicted time when the event notification is possible.

52. The method as claimed in claim 49, wherein,
if the preference rules do not allow the event notification, the event notification controller stores the event notification in the event notification controller until the preference rules allow the event notification.

53. A watcher client for controlling event notification according to a preference of a subscriber, the watcher client comprising:

a processor configured to generate preference rules according to a subscription request from the subscriber for conditionally receiving an event notification; and
a transceiver configured to transmit the subscription request including the preference rules to a subscription target in a presentity domain when recognizing that the watcher client is in a different domain than the subscription target, and
receive the event notification from the subscription target when the preference rules currently allows the event notification,
wherein the watcher client is in a watcher domain.

54. A subscription target for controlling event notification according to a preference of a subscriber, the subscription target comprising:
- a transceiver configured to receive a subscription request including preference rules from a watcher when it is recognized that the watcher is in a different domain than the subscription target; and
- a processor configured to hold transmission of the event notification to be provided to the subscriber until the preference rules are satisfied,
- wherein the subscription target is in a presentity domain, the subscription request is for conditionally receiving the event notification, and the watcher is in a watcher domain.

55. A presence server for providing presence notifications, comprising:
- a transceiver configured to receive a request including preference rules from a watcher client; and
- a processor configured to store the preference rules when the request has been authorized using authorization related information stored in a presence Extensible Markup Language (XML) Document Management Server (XDMS), and
- control the transceiver to send a presence notification of another client in a presentity domain to the watcher client when the presence notification has passed the preference rules and when recognizing that the presence server is in a different domain than the another client,
- wherein the preference rules are defined based on presence attributes of the watcher client, and
- wherein the presence server is in a watcher domain.

56. The presence server as claimed in claim 55, wherein the watcher client is authorized to watch the presence information of the other user.

57. The presence server as claimed in claim 55, wherein the processor checks the presence attributes of the watcher client based on the preference rules, when the presence notification is generated, wherein the presence notification comprises presence attributes as requested by the watcher client; and
- when the presence attributes of the watcher client match the preference rules, the presence server sends the presence notification to the watcher client.

58. The presence server as claimed in claim 55, wherein the presence attributes of the watcher client comprise at least one of away, meeting, and close.

59. A method for providing presence notifications, the method comprising:
- receiving, at a presence server in a watcher domain, a request including preference rules from a watcher client, wherein the preference rules are defined based on presence attributes of the watcher client;
- storing, at the presence server, the preference rules, when the request has been authorized using authorization related information stored in a presence Extensible Markup Language (XML) Document Management Server (XDMS); and
- sending a presence notification of another client in a presentity domain from the presence server to the watcher client, when the presence notification has passed the preference rules and when recognizing that the presence server is in a different domain than the another client.

60. The method as claimed in claim 59, wherein the watcher client is authorized to watch the presence information of a user.

61. The method as claimed in claim 59, further comprising:
- checking the presence attributes of the watcher client based on the preference rules, when the presence notification is generated, wherein the presence notification comprises presence attributes as requested by the watcher client;
- wherein, when the presence attributes of the watcher client match the preference rules, the presence notification is sent to the watcher client.

62. The method as claimed in claim 59, further comprising enabling or disabling the preference rules according to a request of the watcher client.

63. The method as claimed in claim 59, further comprising removing the preference rules according to a request of the watcher client.

64. The method as claimed in claim 59, wherein the preference rules comprises detailed conditions to be checked before sending the presence notification and the method further comprises:
- evaluating the detailed conditions, when the request is received; and
- sending a positive presence response to the watcher client, when the server is able to handle the detailed conditions.

65. The method as claimed in claim 64, wherein the presence attributes of the watcher client comprise at least one away, meeting and close.

66. A method for receiving presence notifications, comprising:
- generating, at a watcher client, a request including preference rules, wherein the preference rules are defined based on presence attributes of the watcher client;
- sending the request to a presence server in a watcher domain; and
- receiving a presence notification of another client in a presentity domain from the presence server, when it is recognized that the presence server is in a different domain than the another client, the request has been authorized using authorization related information stored in a presence Extensible Markup Language (XML) Document Management Server (XDMS), and the presence notification has satisfied the preference rules.

67. The method as claimed in claim 66, further comprising sending a request for enabling or disabling the preference rules.

68. The method as claimed in claim 66, further comprising sending a request for removing the preference rules.

69. A client for receiving presence notifications, comprising:
- a processor configured to generate a request including preference rules;
- a transceiver configured to send the request to a server in a watcher domain, and receive, from the server, a presence notification of another client in a presentity domain, when it is recognized that the server is in a different domain than the another client, the request has been authorized using authorization related information stored in a presence Extensible Markup Language (XML) Document Management Server (XDMS), and the presence notification has satisfied the preference rules,
- wherein the preference rules are defined based on presence attributes of the client.

* * * * *